May 23, 1950 M. H. WOLFF 2,508,558
CLUTCH
Filed March 24, 1947
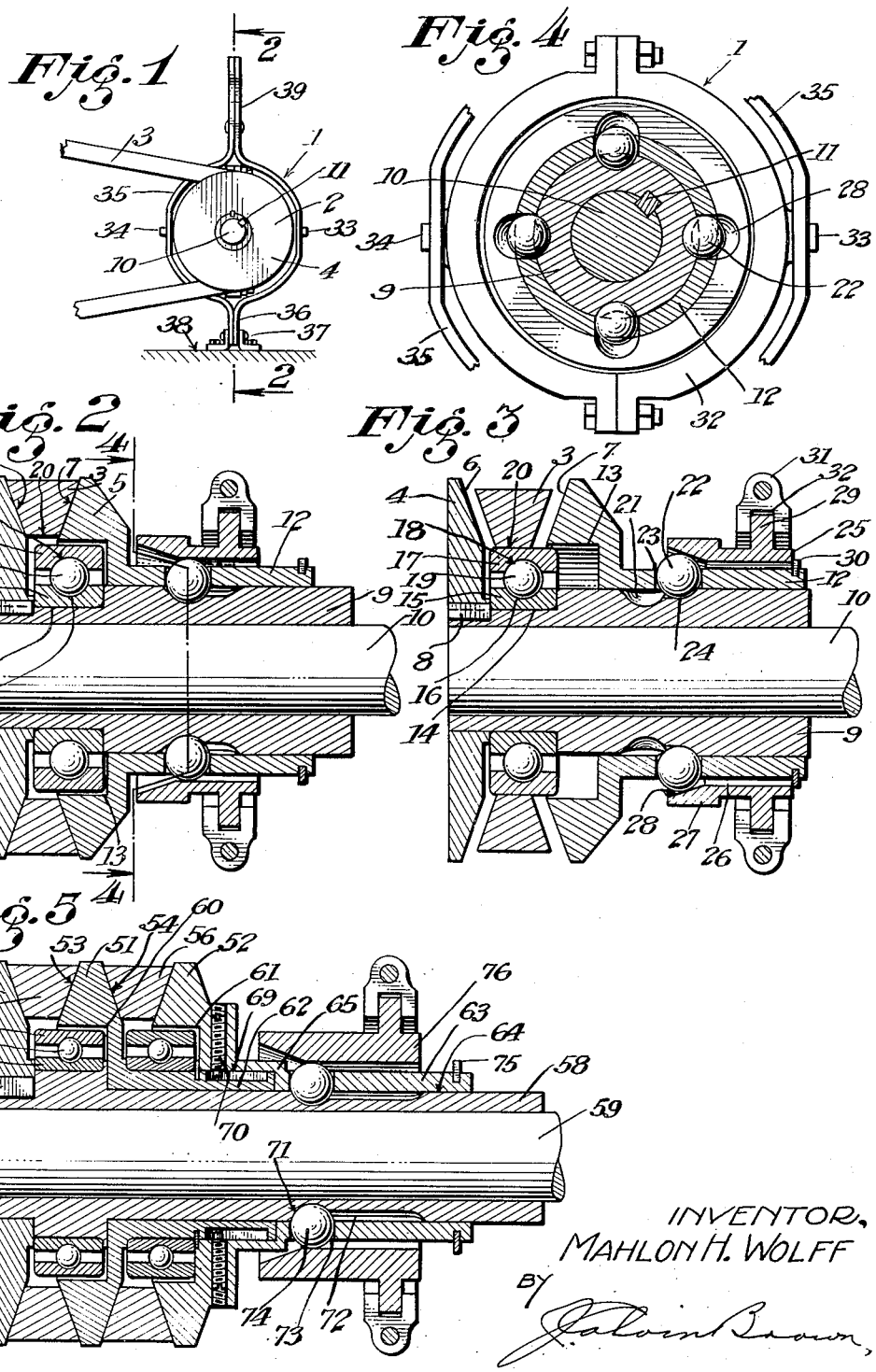
INVENTOR,
MAHLON H. WOLFF
BY
ATTORNEY.

Patented May 23, 1950

2,508,558

UNITED STATES PATENT OFFICE 2,508,558

CLUTCH

Mahlon H. Wolff, Los Angeles, Calif.

Application March 24, 1947, Serial No. 736,680

5 Claims. (Cl. 74—230.17)

The present invention relates broadly to clutches and more specifically to a V-belt pulley clutch construction, which introduces features of construction which render the clutch easy to operate, foolproof, and which is generally superior to V-type pulley clutches now known to the inventor.

An object of the present invention is the provision of a V-belt clutch construction which is positive in operation, stress resisting, simple of structure, efficient and inexpensive both to construct and to assemble, and which is likewise readily dismantled in case of failure from any cause.

A further object of the invention is the provision of a structure which is adaptable for multi-pulley belt operation. It is well known that the average V-belt of a given size will transmit a given amount of power, and for the transmission of more power more belts must be used. However the average construction is considerably complicated when several belts are employed, whereas with the present invention the same principle of construction, whether it be for one belt or more than one belt, is maintained.

Further objects of the invention will appear to those skilled in the art from the description hereinafter given.

In the drawing:

Fig. 1 is a fragmentary side elevation of the invention;

Fig. 2 is a sectional view on an enlarged scale taken on the line 2—2 of Fig. 1;

Fig. 3 is a longitudinal sectional view, similar to Fig. 2, certain parts being in changed relationship;

Fig. 4 is a fragmentary sectional view on the line 4—4 of Fig. 2; and

Fig. 5 is a longitudinal sectional view of a multiple V-belt clutch construction employing the invention.

Referring now to the drawing:

The improved V-belt clutch shown in Fig. 1 is designated as an entirety by 1, wherein 2 is the pulley or sheave adapted to drive or be driven by the V-belt 3. The pulley or sheave 2 includes two flanges 4 and 5, the opposite inner faces 6 and 7 of which are pitched in accordance with the pitch of the side walls of the belt 3. The flange 4 is keyed at 8 to a sleeve or hub 9, the sleeve being carried on a shaft 10. The sleeve 9 and shaft 10 are keyed together at 11, see Fig. 1. Thus any rotation of the flange 4 produces simultaneous rotation of the sleeve 9 and shaft 10. The flange 5 is integral with a sleeve or hub 12, and is slidably mounted on sleeve 9. The flange 5 is formed with an annular groove or recess 13. Sleeve 9 is annularly grooved at 14 to receive a ring 15. Ring 15 is provided with a ball race 16. Spaced from the ring 15 is a ring 17 formed with a ball race 18, and between the races 16 and 18 are balls 19. The ring 17 is disposed within the annular groove or recess 13 of flange 5. However the ring 17 does not touch flange 5. The ring 17 is situated immediately below the base 20 of the V-belt 3, and in such a position that if flange 5 is moved to the right of the showing of Fig. 2, or to the position shown in Fig. 3, the base 20 of the belt will ride upon the periphery of ring 17, which ring is commonly known as a free rotator. In the parts position of Fig. 3 it is apparent that while the belt may turn, no power is transmitted to or from the flanges of the pulley.

It is intended by this invention that the movable flange 5 should be so related to the sleeve 9 as to be locked in a closed position, as shown in Figure 2 or in unlocked position in Figure 3 by means which has been found to be highly efficient in actual use and service.

The sleeve 9 is provided with one or more equidistantly spaced apart semi-spherical recesses 21 disposed around the periphery thereof to receive balls 22. The balls 22 are suitably caged in the hub 12 by providing one or more equidistantly spaced apart transverse bores 23, the bores in each instance being of slightly greater diameter than a ball. Immediately adjoining and communicating with each semi-spherical recesses 21 and in the sleeve 9, is a longitudinal ball groove 24 of a lesser depth than the recess 21. An actuating collar 25 for the balls is slidably mounted on the hub 12 and has a series of spaced, longitudinally-extending parallel ball grooves 26 which communicate with outwardly diverging ball grooves 28. Collar 25 has an enlarged annular portion 27 and an annular flange 29. The relationship is such that when the collar 25 is in the position shown in Fig. 2, each ball 22 is confined between a groove 26 of the collar and a locking recess or pocket 21 of the sleeve. When the collar is moved from the position of Fig. 2 to that of Fig. 3, each ball is confined between a longitudinal ball groove 24 and the outwardly diverging ball groove 28 of the collar. The hub 12 carries an annular stop 30, and when the collar 25 is moved to the right of Fig. 2, one end of said collar will engage the stop, to in turn cause lateral movement of the hub 12 on sleeve 9. Each ball will be forced to move from a locking recess 21 in Fig. 2 and forced to travel laterally in a ball groove 24.

A split collar 31 is annularly grooved at 32, so as to confine the flange 29, and said split collar carries diametrically disposed trunnions 33 and 34, which trunnions are journaled in a yoke 35. This yoke terminates in a leg portion 36 which may be swingingly mounted by means 37 to a support 38, while the diametrically opposite portion of the yoke is fashioned into a handle 39. Obviously, moving the handle 39 will produce movement of the actuating collar 25 and move the balls 22 from the position of Fig. 2 to that of Fig. 3, or vice versa.

The construction shown in Fig. 5 does not differ materially from that described for Figs. 1 to 4 inclusive, save and except that such construction is adaptable for multiple belts. In the construction of Fig. 5, I provide two pulleys consisting of three flanges 50, 51 and 52. Flange 51 has pitched faces 53 and 54 for cooperation with the pitched faces of flanges 50 and 52. This construction contemplates two V-type belts 55 and 56. Flange 50 is keyed at 57 to hub or sleeve 58 carried on shaft 59. Sleeve 58 and shaft 59 are keyed together in the same manner as shaft 10 is keyed to sleeve 9, as shown in Fig. 1 at 11. Flanges 51 and 52 are respectively annularly grooved at 60 and 61, and flange 51 is provided with a hub 62 carried on sleeve 58. Flange 52 is provided with a hub 63 having a portion 64 carried on sleeve 58, and a stepped portion 65 which accommodates a portion of hub 62. Spaced apart pairs of race rings 66 and 67, with interposed balls 68, are positioned within the annular grooves 60 and 61, one of said pairs 66 being carried on sleeve 58, while the other pair 67 is carried on hub 62. Hub 62 is provided with one or more spaced apart longitudinally extending grooves 69, adapted to receive a key 70, the key being carried by flange 52. The key in the present instance constitutes a threaded pin received in a threaded opening of the flange and having an end projecting within a groove 69. Thus the key has movement within the groove. Sleeve 58 is provided with one or more locking recesses 71, and with longitudinal ball grooves 72 of lesser depth than ball recesses 71 but connecting therewith. The hub 63 is provided with one or more transverse bores 73, which function in each instance as a cage for a ball 74, which ball is adapted to be received within a pocket or recess 71, or moved from said recess into the longitudinal ball groove 72 when hub 63 is shifted on sleeve 58. Hub 63 carries an annular stop 75, and spacedly surrounding hub 63 is an actuating collar 76. This collar is substantially identical with the actuating collar 25 and cooperates with a split collar of the type shown in Fig. 3 at 29, which is adapted to be actuated coordinate with said split collar, see Fig. 1.

The operation, uses and advantages of the invention are as follows:

First referring to Figs. 1 to 4, the construction is such that when the actuting collar 25 is in the position shown in Fig. 2, each ball 22 is confined between a parallel ball groove 26 of said collar and a locking recess 21. The flanges 4 and 5 will then be in engagement with the pitched faces of the belt 3, and the base 20 of the belt will be spaced from ring 17.

In the embodiment shown, assuming that the belt 3 is driving the pulley, it is evident that the pulley, viewing Fig. 2, will rotate shaft 10; this for the reason that flange 4 is keyed at 8 to sleeve 9, and the sleeve in turn is keyed at 11 to the shaft 10. The flange 5 in turn is in positive locked engagement with sleeve 9, for the reason that each ball 22 is within a recess 21 and held in said recess, and against escape therefrom, by collar 25. It will be noted that each ball is in engagement with the wall bounding a ball groove 26 of actuating collar 25.

When it is desired to have the belt run free, handle 39 is moved in one direction, which will shift the collar 25 from the right of the showing of Fig. 2 to the position shown in Fig. 3. The actuating collar will first be moved to position the balls 22 within the diverging ball groove portion of the collar, followed by the collar contacting stop 30, whereupon movement of the hub 12 will occur. As each ball 22 is confined within a bore 23, each ball must also move to the right in step with movement of the hub 12, to position the ball in a longitudinal ball groove 24. The belt 3 will have its base surface 20 in engagement with ring 17, and as this is a free ring, the belt may rotate without driving the pulley.

The operation of the device depicted in Fig. 5 is substantially the same as that in Figs. 1 to 4, with the following additional explanation: When the actuating collar 76 is moved to the right to contact stop 75, further movement thereof will move hub 63 and cause each ball 74 to move from a locking recess 71 into a ball groove 72, the ball engaging the diverging ball groove of said sleeve 76. Such movement will cause the flange 52 to separate from the flange 51, and permit the belt 56 to engage the free-running ring of rings 67. As the hub 63 moves, key 70 travels within the elongated slot 69 of hub 63 until the key reaches the excursion of its movement, whereupon the key will engage the hub 62 and continued movement will cause slide movement of the hub 62 on sleeve 58 to cause separation of flanges 50 and 51. Such separation will permit the belt 55 to rest upon the free ring of rings 66 positioned in annular groove 60 of flange 51. In the construction of Fig. 5 it is evident that separation of the belts from their respective flanges is progressive. In the retrograde movement, flange 52 will move toward the free-running belt 56 to shift the same toward flange 51 and prior to a ball 74 moving from the ball groove 72 into a locking recess 71. During the movement of hub 63, the key 70 will contact the opposite end or wall adjoining groove 61 and cause movement of flange 51 toward flange 50, the flanges all being in the position shown in Fig. 5 by the time a ball 74 is permitted to be received within a recess or pocket 71.

A brief summary of the advantages of the invention will disclose the fact that the sides of the belt when engaging both flanges of a sheave, drive a shaft so that the shaft rotates positively both flanges. Hence the present invention is so constructed and arranged that one flange of a sheave does not rotate freely while the other flange drives a shaft, or vice versa. Sheaves of the character just stated cause undue wear on a belt unless the flanges are both driven. In the present invention one of the flanges of a sheave is positively locked closed for belt engagement, or unlocked and separated from the other flange so that the belt may travel freely on a freely rotating ring. The positive lock assures that the flanges are repeatedly spaced apart a predetermined distance in their closed or operating position and that the lever 39 will not change its position unless a force be applied thereto after a locking movement thereof. Furthermore, the construction permits the operator at will to gradually increase the tension on a V-belt equally on each side of the belt as he moves the lever to cause belt engagement and thereby gradually increase the load on the belt.

I claim:

1. A clutch as disclosed, including a sheave having two flanges, one of which is fixed and the other of which is shiftable, a hub keyed to the fixed flange, a sleeve hub carried on the periphery of the first hub, the sleeve hub secured to the shiftable flange, said sleeve hub formed with a transverse bore and said first hub provided with a peripheral communicating spherical recess and a longitudinal ball groove of lesser depth, a ball within the transverse bore of the sleeve hub for reception in the spherical recess or the ball groove of the first hub, a collar surrounding the sleeve hub, said collar having a parallel ball groove portion and a communicating outwardly diverging ball groove, said ball being maintained within the parallel ball groove portion in the collar and in the spherical recess in the first hub, a shifting of the collar in one direction to separate shiftable flange from the fixed flange, positioning the ball in the outwardly diverging ball groove of the collar and the longitudinal ball groove of the first hub, the sleeve hub, the collar and first hub being in uniform rotational engagement at all times and positively locked when the ball is forced into the spherical recess.

2. A clutch as disclosed, including a hub, a sheave having two flanges, one of which is in fixed driving relationship with said hub and the other of which is shiftable laterally on said hub to effect approach or separation of the flanges, said shiftable flange provided with a sleeve hub carried on the first hub, a ball carried by the sleeve hub, the first hub formed with a recess and groove for receiving said ball and for maintaining the sleeve hub at all times in uniform rotational relationship with said first hub, and for locking the shiftable flange in one position laterally relative to the fixed flange.

3. A clutch as disclosed, wherein a sheave has two flanges, one of which flanges is fixed and the other of which is shiftable relative to the fixed flange, the inner faces of said flanges being pitched to receive a V-type belt therebetween and for driving relationship with said belt when said shiftable flange is in one position, and to completely release said belt from engagement with said pitched faces of both flanges when the shiftable flange is in a second position, including: a first hub keyed to the fixed flange, a sleeve hub carried on the first hub, the sleeve hub integral with the shiftable flange, a ball carried by the sleeve hub, said first hub formed with a recess communicating with a ball groove of lesser depth, a collar surrounding the sleeve hub for maintaining the ball in the recess or ball groove of said first hub, said collar maintaining the ball in the recess which is of greater depth than the communicating groove when the pitched faces of both flanges are in driving relationship with the V-belt, a shifting of said collar permitting the separation of the shiftable flange from the first flange and positioning the ball in the groove which is of lesser depth than the communicating recess, the sleeve hub at all times being in uniform radial relationship with the first hub and positively locked when the belt is in driving position.

4. A clutch as disclosed, including a sheave having two flanges, a first hub with one of the said flanges keyed to said hub, said other flange formed with a sleeve hub carried on the first hub, a ball carried by the sleeve hub, the first hub formed with a recess and communicating ball groove of different depths and adapted to receive said ball, a collar surrounding the sleeve hub for positioning said ball in the recess or communicating ball groove, a stop member carried by said sleeve hub, said collar maintaining said ball in the recess when the flanges of the sheave are in driving relationship with a V-belt positioned therebetween, shifting of said collar causing engagement with the stop to in turn move the shiftable flange and position the ball in the ball groove of lesser depth, the said sleeve hub, said first hub and said collar at all times being maintained in positive uniform rotational engagement, and said flanges being separated to completely release the V-belt from engagement therewith.

5. A clutch as disclosed, including a sheave having two flanges, a first hub, one of the said flanges keyed to the hub; said other flange formed with a sleeve hub carried on the first hub, a ball carried by the sleeve hub, the first hub formed with a spherical recess and communicating ball groove of different depths and adapted to receive said ball, a collar surrounding the sleeve hub and for positioning said ball in the spherical recess or communicating ball groove of different depths, a stop member carried by said sleeve hub, said collar locking said ball in the spherical recess when the flanges of the sheave are in driving relationship with a V-belt positioned therebetween, shifting of said collar causing engagement with the stop to in turn move the shiftable flange and position the ball in the ball groove which is of lesser depth than the spherical recess, the said sleeve hub and said collar and said first hub being maintained in uniform rotational engagement with the flanges at all times, said flanges being separated to completely release the V-belt from engagement therewith.

MAHLON H. WOLFF.

REFERENCES CITED

The following references are of record in the file of this patent:

UNITED STATES PATENTS

| Number | Name | Date |
|---|---|---|
| 1,068,188 | Vincent | July 22, 1913 |
| 2,182,956 | Beyerline | Dec. 12, 1939 |
| 2,259,149 | Cederstrom | Oct. 24, 1941 |

FOREIGN PATENTS

| Number | Country | Date |
|---|---|---|
| 25,400 | Great Britain | Nov. 19, 1902 |